United States Patent

Parker

[15] 3,657,001
[45] Apr. 18, 1972

[54] PROCESS FOR HOT SPRAYING A THERMOSETTING ACRYLIC ENAMEL MODIFIED WITH CELLULOSE ACETATE BUTYRATE

[72] Inventor: Fred W. Parker, Flint, Mich.
[73] Assignee: E. I. du Pont de Nemours and Company, Wilmington, Del.
[22] Filed: Dec. 22, 1970
[21] Appl. No.: 100,831

Related U.S. Application Data

[63] Continuation-in-part of Ser. No. 780,190, Nov. 29, 1968, abandoned.

[52] U.S. Cl.................117/105.1, 117/132 A, 117/132 BF, 117/161 C, 117/161 L, 117/161 LN, 117/161 UC, 260/15, 260/80.75
[51] Int. Cl..........................................B44d 1/08
[58] Field of Search..........117/105.1, 132 A, 132 BF, 161 C, 117/161 L, 161 LN, 161 UC; 260/15, 80.75

[56] References Cited

UNITED STATES PATENTS 2,763,575 9/1956 Bede....................117/105.1
2,889,237 6/1959 Ball......................117/105.1 X

*Primary Examiner*—Edward G. Whitby
*Attorney*—Hilmar L. Fricke

[57] ABSTRACT

The process for hot spraying a paint of a thermosetting acrylic enamel modified with cellulose acetate butyrate comprises the following steps:

1. heating the paint having a high solids content of film-forming materials to about 50–100°C. to reduce the viscosity of the paint; wherein the film-forming materials of the paint consist essentially of:
   A. an acrylic polymer containing styrene, methyl methacrylate, a soft constituent, such as an alkyl acrylate or an alkyl methacrylate other than methyl methacrylate, a hydroxy containing constituent which is either a hydroxy alkyl acrylate or a hydroxy alkyl methacrylate, and an $\alpha, \beta$-unsaturated monocarboxylic acid;
   B. cellulose acetate butyrate; and
   C. a thermosetting nitrogen containing resin;

2. spraying the paint onto a substrate with an air spray gun using a specific atomization pressure and a specific fluid flow; and 3. baking the coating substrate.

The novel process is particularly useful for applying a finish at a high solids content to automobiles and trucks in the manufacturing plant and in repair garages and has the advantage of using substantially less solvent than conventional finishes and thereby reduces air pollution.

11 Claims, No Drawings

PROCESS FOR HOT SPRAYING A THERMOSETTING ACRYLIC ENAMEL MODIFIED WITH CELLULOSE ACETATE BUTYRATE

CROSS REFERENCE TO RELATED APPLICATIONS

This application is a continuation-in-part application to my copending application Ser. No. 780,190, filed Nov. 29, 1968, now abandoned.

BACKGROUND OF THE INVENTION

This invention relates to a process for the application of a thermosetting acrylic enamel and, in particular, to a process for hot spray application of a thermosetting acrylic enamel that has been modified with cellulose acetate butyrate.

There is a great need in the automobile and truck manufacturing industry for a process that will apply a high quality finish at low levels of air pollution. The thermosetting acrylic enamel modified with cellulose acetate butyrate utilized in the novel process of this invention provides a finish that is comparable in appearance to conventional polymethyl methacrylate lacquers and the finish can be applied at relatively high film-forming polymer solids levels which substantially reduces air pollution. Typical polymethyl methacrylate lacquers are shown in Evans U.S. Pat. No. 2,849,409, issued Aug. 28, 1958; Johnson U.S. Pat. No. 2,782,131, issued Feb. 19, 1957 and Crissey and Lowell U.S. Pats. Nos. 2,934,509 and 2,934,510, both issued Apr. 26, 1960. These lacquers form excellent finishes but cannot be sprayed under elevated temperatures at high solids without the webbing of the polymer in the coating.

Thermosetting acrylic enamel coatings are well known in the art as shown by Fraizer U.S. Pat. No. 2,681,897, issued June 22, 1954; Vasta U.S. Pat. No. 3,338,860, issued Aug. 29, 1967; Fisk et al., U.S. Pat. No. 3,365,414, issued Jan. 23, 1968. These coatings can be sprayed at high solids but do not provide finishes with acceptable appearance, particularly when metallic flake pigments are utilized in the coating.

Thermosetting acrylic enamels modified with cellulose acetate butyrate are shown in Lowe et al. U.S. Pat. No. 3,411,941, issued Nov. 19, 1968, but these enamels have to be reduced with solvents to acceptable spray viscosities and do not provide a coating composition that can be applied at a high polymer solids level.

SUMMARY OF THE INVENTION

The process for hot spraying a paint of a thermosetting acrylic enamel modified with cellulose acetate butyrate comprises the following steps:

1. heating the paint to about 50°–100° C. thereby reducing the viscosity of the paint to a spray viscosity of about 20–100 seconds measured in a No. 4 Ford cup wherein the paint comprises about 25–60% by weight of a film-forming polymer blend and a solvent for the polymer blend; the polymer blend is of the following constituents
   A. 50–80% by weight of an acrylic polymer which consists essentially of
      a. 0–25% by weight styrene,
      b. 25–55% by weight methyl methacrylate,
      c. 38–48% by weight of a soft constituent which is either an alkyl acrylate or an alkyl methacrylate in which the alkyl groups have two to four carbon atoms,
      d. 5–20% by weight of a hydroxy containing constituent which is either a hydroxy alkyl acrylate or a hydroxy alkyl methacrylate in which the alkyl groups contain one to eight carbon atoms, and
      e. 1–5% by weight of an $\alpha,\beta$-unsaturated monocarboxylic acid;
   wherein the acrylic polymer has a relative viscosity of 1.04–1.10 measured at 25° C. in ethylene dichloride according to ASTM-D-445-46-T, Method B;
   B. 5–50% by weight of cellulose acetate butyrate having a butyryl content of about 45–55% by weight and a viscosity at 25° C. of about 1–6 seconds measured according to ASTM-D-1343-56; and
   C. 5–50% by weight of a compatible thermosetting nitrogen containing resin;
2. spraying the hot paint onto a substrate utilizing an air spray gun with an atomization pressure of 50 to 100 pounds per square inch and a fluid flow of 10–50 ounces per minute; and
3. baking the coated substrate at about 80°–160° C. for about 5 to 30 minutes to form a smooth and glossy film.

DETAILED DESCRIPTION OF THE INVENTION

The process of this invention utilizes a paint of a thermosetting acrylic enamel modified with cellulose acetate butyrate. The film-forming polymer solids content of this paint is from about 25–60% by weight, and preferably, 35–45% by weight solids. The paint is heated to about 50°–100° C., and preferably, to about 75°–90° C. before application. This reduces the viscosity of the paint to a spray viscosity of about 20–100 seconds, and preferably 30–40 seconds measured in a No. 4 Ford cup. The paint is then sprayed under these heated conditions unto a substrate.

Any conventional air spray gun may be used for spraying the paint. The spray gun is operated at an atomization pressure of 20 to 100 psi, and preferably, at an atomization pressure of 60–90 psi. The spray gun is operated at a flow rate of the paint of 10–50 ounces per minute and preferably, 15–30 ounces per minute. Generally, the paint is applied with several passes of the spray gun and a film about 0.5–5 mils thick, and preferably 1–3 mils thick is formed on the substrate. The coated substrate is baked at 80°–160° C. for about 5–30 minutes and then the coated area is buffed to form an even, smooth and glossy surface. A conventional buffing compound need not be used since the coating has lacquer-like properties, e.g., car polish may be used to obtain the desired finish. Any of the conventional buffing techniques can be utilized in this process.

The acrylic polymer used to form the thermosetting acrylic enamel utilized in the process of this invention is prepared by conventional polymerization techniques in which the monomer constituents are blended with solvents and a polymerization catalyst and heated to 75°–150° C. for about 2-6 hours to form a polymer that has a relative viscosity of about 1.04–1.10, and preferably, about 1.06–1.09. The "relative viscosity" is the value obtained by dividing the efflux time of a solution of the polymer by the efflux time of the solvent used to form the above polymer solution. The efflux times are measured according to the procedure of ASTM-D-445-46-T, Method B, using as the polymer solution 0.25 gram of the polymer in 50 cubic centimeters of ethylene dichloride as the solvent. The efflux times are measured at 25° C. in a standard apparatus, sold under the designation of a modified Ostwald Viscometer.

About 0.1–4% by weight based on the weight of the monomer of a polymerization catalyst is used to prepare the acrylic polymer. Typical catalysts are ditertiary butyl peroxide, cumene hydroperoxide, azobisisobutyronitrile and the like.

One preferred acrylic polymer used in the process of this invention contains about 0–25% by weight styrene and about 25–55% by weight methyl methacrylate. The polymer contains 38–48% of a soft constituent which is either an alkyl acrylate or an alkyl methacrylate in which the alkyl groups contain two to four carbon atoms. The following are typical monomers used as the soft constituent: ethyl acrylate, propyl acrylate, isopropylacrylate, butyl acrylate, isobutyl acrylate, ethyl methacrylate, propyl methacrylate, isopropyl methacrylate, butyl methacrylate and the like. Butyl acrylate is the preferred soft constituent since it forms a polymer that has excellent physical properties which are particularly desirable for the novel coating composition of this invention.

This preferred acrylic polymer contains 5–20% by weight of hydroxy containing compound. Typical useful hydroxy containing compounds are hydroxyalkyl acrylates or hydroxyalkyl methacrylates in which the alkyl groups contain two to eight carbon atoms; for example, hydroxyethyl acrylate, hydroxypropyl acrylate, hydroxybutyl acrylate, hydroxyhexyl acrylate, hydroxyoctyl acrylate and the like, hydroxyethyl methacrylate, hydroxypropyl methacrylate, hydroxybutyl methacrylate, hydroxyhexyl methacrylate, hydroxyoctyl methacrylate and the like.

This preferred acrylic polymer also contains about 1–5% by weight of an α,β-unsaturated monocarboxylic acid. Typically useful α,β-ethylenically unsaturated monocarboxylic acids used to prepare the acrylic polymer are acrylic acid, methacrylic acid, crotonic acid, ethacrylic acid, propylacrylic acid, isopropylacrylic acid and the like. Preferred are acrylic acid and methacrylic acid since these acids form a high quality polymer.

One particularly useful acrylic polymer used in this invention contains 0–18% by weight styrene 25–45% by weight methyl methacrylate, 40–43% by weight of an alkyl acrylate, or an alkyl methacrylate, having two to four carbon atoms in the alkyl groups, 8–18% by weight of one of the aforementioned hydroxy containing constituents, 1–4% by weight of either acrylic acid or methacrylic acid.

Another useful acrylic polymer which gives a high quality repair coating contains 10–18% by weight styrene, 25–30% by weight methyl methacrylate, 38–42% by weight butyl acrylate, 10–16% by weight hydroxyethyl acrylate and 1–3% by weight acrylic acid.

Another particularly useful acrylic polymer contains 40–50% by weight methyl methacrylate, 40–80% by weight butyl acrylate, 6–10% by weight hydroxyethyl acrylate and 3–5% by weight acrylic acid.

In the paint composition used in the process of this invention, about 5–50% by weight, and preferably, about 10–30% by weight, based on the weight of the film-forming polymer of the enamel composition, of cellulose acetate butyrate is used. The cellulose acetate butyrate used is in this invention has a butyryl content of about 45–55% by weight and has a viscosity of about 1–8 seconds, and preferably, a viscosity of 1–6 seconds determined at 25° C. according to the method of ASTM-D-1343-56. Surprisingly, the cellulose acetate butyrate in the above amounts in the coating is miscible and compatible with the acrylic polymer and forms excellent high quality coatings.

The other constituent used in the paint composition is a heat reactive condensate which provides thermosetting characteristics and improves the hardness, solvent resistance, alkali and heat resistance of the coating. About 5–50% by weight, based on the weight of the film-forming polymers of the coating, of heat reactive condensate is used, and preferably, about 10–25% by weight of the heat reactive condensate is used.

The heat reactive condensate used to prepare the compositions used in this invention are melamine formaldehyde resins that are at least partially alkylolated. These preferred alkylolated melamine formaldehyde resins have one to four carbon atoms in the alkyl group and are those that are well known in the art. These resins are prepared by conventional techniques in which a lower alkyl alcohol such as, methanol, ethanol, butanol, isobutanol, propanol, isopropanol and the like is reacted with the melamine formaldehyde resin to provide pendent alkoxy group or groups. Methylolated melamine formaldehyde resins having three to six methylol groups are particularly useful. One preferred melamine resin used in this invention, because of its availability and since it forms a high quality coating composition is an essentially monomeric, partially methylolated melamine formaldehyde, e.g., a resin of melamine/formaldehyde/methanol in a molar ratio of 1/5/3 is preferred. Hexamethoxymethylol melamine can also be used.

Sucrose benzoate can be used in the coating compositions used in this invention in amounts of about 2–10% by weight, based on the weight of the film-forming material in the composition.

Plasticizers can be used in the coating compositions in amounts up to 20% by weight of the film-forming material. Preferably, about 3–8% by weight of a plasticizer is used. Functional polymeric plasticizers which react with the constituents in the coating composition can be used, such as epoxidized soya bean oil, oil free and oil modified alkyds and polyesters, such as, polyorthophthalate esters, polyalkylene adipate esters or polyarylene adipate esters.

Volatile non-functional monomeric plasticizers can also be used, such as butylbenzyl phthalate, dibutyl phthalate, triphenyl phosphate, 2-ethylhexylbenzyl phthalate, dicyclohexyl phthalate, dibenzyl phthalate, butyl-cyclohexyl phthalate, mixed benzoic acid and fatty oil acid esters of pentaerythritol, poly(propylene adipate)dibenzoate, diethylene glycol dibenzoate, tetrabutylthiodisuccinate, butyl phthalyl butyl glycolate, acetyltributyl citrate, dibenzyl sebacate, tricresyl phosphate, toluene ethyl sulfoamide, the di-2-ethylhexyl ester of hexamethylene diphthalate, di(methyl cyclohexyl) phthalate.

An acid catalyst may be used in the paint composition to increase the rate of curing of the enamel. Generally, about 0.5–10% by weight, based on the weight of the film-forming constituents is used. Typical catalysts are, for example, alkyl acid phosphates such as, butyl acid phosphate or the half ester of butyl acid phosphate, butyl acid maleate and the like. Any aromatic acid phosphates such as, phenyl acid phosphate can also be used. An aromatic sulfonic acid, such as para toluene sulfonic acid, is a useful catalyst. Acid anhydrides, such as chloromaleic anhydride, also form useful catalysts.

Any of the solvents and diluents which are commonly used in the preparation of the enamel and lacquer compositions can be used in the above paint such as, toluene, xylene, butyl acetate, acetone, methyl isobutyl ketone, methyl ethyl ketone, butyl alcohol, isopropanyl alcohol, cellosolve, cellosolve acetate, and other aliphatic, cycloaliphatic or aromatic hydrocarbons, esters, ethers, ketones, and alcohols.

Pigments utilized in the above paint composition are those that are conventionally used in lacquers and enamels and can be used in amounts of about 0.1–20% pigment volume concentration. Examples of these pigments which are used are metallic oxides, such as titanium dioxide, zinc oxide, iron oxide and the like, metal hydroxides, metal flakes, metal powders, chromates, such as lead chromate, sulfides, sulfates, carbonates, carbon black, silica, talc, china clay, iron blues, organic reds, maroons and other organic dyes and lakes.

The novel process of this invention is used to finish a suitably primed metal substrate. Typical alkyd primers or epoxy primers pigmented with iron oxide, carbon black, titanium dioxide and the like can be used. Also, the novel composition can be used directly over galvanized steel to form a durable coating. However, a sealer coat can be used to provide coatings with excellent adhesion and smoothness. Typically useful sealer compositions are disclosed in Rohrbacher U.S. Pat. No. 3,509,086, issued Apr. 28, 1970.

The process of this invention can be used to repair damaged enamel finishes. The area to be repaired if first sanded smooth by using conventional sanding or buffing equipment. The area to be repaired may be first filled with any of the well-known auto body fillers and then sanded smooth. If the enamel coating is only scratched, a filler is not required and the scratches are sanded out of the coated area. A 60–600 grit abrasive paper is used to sand the area to be repaired. A flash primer is generally applied over the sanded area and is air dried. These primers are well known in the art and contain a volatile solvent and are usually pigmented and contain as the film-forming constituents an alkyd resin, an epoxy modified resin or an acrylic resin and a cross-linking agent. The sanded area is then sprayed according to the process of this invention.

The following Example illustrates this invention. The parts and percentages are by weight unless otherwise specified.

EXAMPLE 1

A pigment dispersion is formulated by blending the following ingredients:

| | Parts By Weight |
|---|---|
| Aluminum paste (65.5% solids of finely divided course aluminum dispersed in mineral spirits) | 23.2 |
| Copolymer solution (55% polymer solids in a solvent mixture of butyl alcohol, butyl acetate, ethylene glycol monoethyl ether acetate and a hydrocarbon solvent in which the copolymer is styrene/methyl methacrylate/butyl acrylate/hydroxyethyl acrylate/acrylic acid in a weight ratio of 16/27/40/14.5/2.5) | 55.5 |
| Xylol | 21.3 |
| | Total 100.0 |

A paint composition is formulated by thoroughly blending the following:

| | Parts By Weight |
|---|---|
| Acrylic polymer solution (60% polymer solids of an acrylic polymer of methyl methacrylate butyl acrylate/hydroxy ethyl acrylate/acrylic acid in a weight ratio of 45/43/8/4, the polymer has an acid number of 25–30, a glass transition temperature of about 16° C. and a relative viscosity of 1.07 measured in ethylene dichloride solvent at 25° according to ASTM-D-445-46, Method B) | 2,770 |
| Cellulose acetate butyrate solution (27.5% CAB solids in a 2:1 toluene/acetone solvent mixture, the CAB has a 1 second viscosity measured at 25% polymer solids in a solution of acetone and toluene according to ASTM-D-1343-56 and the butyryl content of the CAB is 53%) | 1808 |
| Melamine resin solution (70% solids in which the resin is a partially methylolated melamine formaldehyde resin, mol ratio of melamine/formaldehyde/methanol is 1.0/5.1/2.8) | 1151 |
| Butylbenzyl phthalate plasticizer | 133 |
| Pigment dispersion (prepared above) | 567 |
| | Total 6429 |

The above ingredients are thoroughly blended together and the resulting paint has a 53% solids content. Four separate spray compositions are prepared by reducing four paint samples with a solvent blend of isopropanol/toluene (4:1 ratio). The compositions have the following respective solids content 45%, 40%, 30% and 28%.

Each of the spray compositions are applied to a separate steel panel primed with a convention alkyd resin primer pigmented with iron oxide. The coated panel is then baked at 135° C. for 30 minutes. The resulting paint films are about 1.5–2.5 mils in thickness and each of the coatings on each of the panels is smooth, even and glossy and the appearance is acceptable. The panels coated with 28 and 30% solids compositions have an outstanding metallic appearance.

A DeVilbiss spray gun with an F X tip opening of 0.0425 inch and a No. 704 air cap is used to apply the above compositions. A fluid pressure on the composition is 17 psi, the fluid flow at the gun is 16.5 ounces per minute and the atomization pressure is 80 psi. Each of the compositions is sprayed at 80° C. and each of the compositions has a spray viscosity of about 30–40 seconds measured in a No. 4 Ford cup. The gun distance to the work is maintained at about 10–12 inches.

I claim:

1. A process for hot spraying a paint of a thermosetting acrylic enamel modified with cellulose acetate butyrate which comprises:
   1. heating the paint to about 50° to 100° C. thereby reducing the viscosity of the paint to a spray viscosity of about 20 to 100 seconds measured in a No. 4 Ford Cup; wherein said paint comprises about 25 to 60% by weight of a film-forming polymer blend and a solvent for the polymer blend; wherein said polymer blend consists essentially of
      A. 50–80% by weight, based on the weight of the polymer blend, of an acrylic polymer which consists essentially of
         a. 0–25% by weight styrene,
         b. 25–55% by weight methyl methacrylate,
         c. 38–48% by weight of a soft constituent selected from the group consisting of an alkyl acrylate and an alkyl methacrylate wherein the alkyl groups have two to four carbon atoms;
         d. 5–20% by weight of a hydroxy containing constituent selected from the group consisting of a hydroxy alkyl methacrylate and a hydroxy alkyl acrylate wherein the alkyl group contain one to eight carbon atoms; and
         e. 1–5% by weight of an $\alpha,\beta$-unsaturated monocarboxylic acid;
      wherein said acrylic polymer has a relative viscosity of 1.04–1.10 measured at 25° C. in ethylene dichloride according to ASTM D–445–46T, Method B;
      B. 5–50% by weight, based on the weight of the polymer blend, of cellulose acetate butyrate having a butyryl content of about 45–55% by weight and a viscosity at 25° C. of about 1–6 seconds measured according to ASTM-D–1343-56; and
      C. 5–50% by weight based on the weight of the polymer, of a melamine formaldehyde resin which has been at least partially reacted with an aliphatic monohydric alcohol having from one to four carbon atoms;
   2. spraying the hot paint onto a substrate utilizing an air spray gun with an atomization pressure of 50 to 100 pounds per square inch and a fluid flow of 10 to 50 ounces per minute
   3. baking the coated substrate at about 80° to 160° C. for about 5 to 30 minutes to form a smooth and glossy film.

2. The process of claim 1 in which the paint contains pigment in a pigment volume concentration of about 1 to 20% and the paint has polymer solids content of 35 to 45% by weight.

3. The process of claim 1 in which the paint is heated to 75°–90 C., the spray viscosity of about 30–40 seconds measured in a No. 4 Ford Cup, the atomization pressure of the gun is 60–90 psi and the fluid flow of the paint is about 15–30 ounces per minute.

4. The process of claim 3 in which the paint contains up to 20% by weight, based on the weight of the film-forming polymer blend, of an organic plasticizer.

5. The process of claim 4 in which the $\alpha,\beta$-ethylenically unsaturated monocarboxylic acid of the acrylic polymer of the paint is selected from the group consisting of acrylic acid and methacrylic acid.

6. The process of claim 4 in which the acrylic polymer of the paint consists essentially of 10–18% by weight styrene, 25–30% by weight methyl methacrylate, 38–42% by weight butyl acrylate, 10–16% by weight hydroxyethyl acrylate and 1–3% by weight acrylic acid.

7. The process of claim 4 in which the acrylic polymer of the paint consists essentially of 40–50% by weight methyl methacrylate, 40–48% by weight butyl acrylate, 6–10% by weight hydroxyethyl acrylate, 3–5% by weight acrylic acid.

8. The process of claim 2 in which the paint comprises 30–50% by weight of a film-forming polymer blend and a solvent for said polymer blend wherein said polymer blend consists essentially of
   A. 55–70% by weight, based on the weight of the polymer blend, of an acrylic polymer which consists essentially of
      a. 0–18% by weight styrene,
      b. 25–45% by weight methyl methacrylate,
      c. 40–43% by weight of an alkyl acrylate in which the alkyl group has two to four carbon atoms;
      d. 8–18% by weight of a hydroxy containing constituent selected from the group consisting of a hydroxy alkyl acrylate and a hydroxy alkyl methacrylate, wherein the alkyl groups have two to four carbon atoms;
      e. 1–4% by weight of an $\alpha,\beta$-unsaturated monocarboxylic acid selected from the group consisting of acrylic acid and methacrylic acid,
   wherein the acrylic polymer has a relative viscosity of 1.06–1.09;

B. 10–30% by weight of cellulose acetate butyrate having a butyryl content of about 45–55% by weight and a viscosity at 25° C. of about 1–6 seconds, C. 10–25% by weight of an alkylolated melamine formaldehyde resin in which the alkyl group has one to four carbon atoms.

9. The process of claim 1 for hot spraying a paint of a thermosetting acrylic enamel modified with cellulose acetate butyrate which comprises 1. heating the paint to about 75°–90° C. thereby reducing the viscosity of the paint to about 30–40 seconds measured in a No. 4 Ford Cup, wherein said paint comprises about 35–45% by weight of a solvent for the polymer blend and up to 20% by weight, based on the weight of the polymer blend of an organic plasticizer wherein said polymer blend consists essentially of A. 55–70% by weight, of an acrylic polymer which consists essentially of
 a. 0–18% by weight styrene,
 b. 25–45% by weight methyl methacrylate,
 c. 40–43% by weight of an alkyl acrylate in which the alkyl group has two to four carbon atoms;
 d. 8–18% by weight of a hydroxy containing constituent selected from the group consisting of a hydroxy alkyl acrylate and a hydroxy alkyl methacrylate, wherein the alkyl groups have two to four carbon atoms,
 e. 1–4% by weight of an α,β-unsaturated monocarboxylic acid selected from the group consisting of acrylic acid and methacrylic acid,
wherein the acrylic polymer has a relative viscosity of 1.06–1.09;

B. 10–30% by weight of cellulose acetate butyrate having a butyryl content of about 45–55% by weight and a viscosity at 25° C. of about 1–6 seconds, C. 10–25% by weight of an alkylolated melamine formaldehyde resin which is at least partially alkylolated in which the alkyl group has one to four carbon atoms;

2. spraying the hot paint onto a primed metal substrate utilizing an air spray gun with an atomization pressure of 60–90 psi and a fluid flow of 15–30 ounces per minute; and 3. baking the coated substrate at about 80° to 160° C. for about 5 to 30 minutes.

10. The process of claim 9 in which the alkylolated melamine formaldehyde resin is a methylolated melamine formaldehyde resin in which the molar ratio of melamine/formaldehyde/methanol is 1/5/3.

11. The process of claim 10 containing 3–8% by weight, based on the weight of the polymer blend, of butylbenzylphthalate plasticizer.

* * * * *

PO-1050
(5/69)

UNITED STATES PATENT OFFICE
CERTIFICATE OF CORRECTION

Patent No. 3,657,001            Dated April 18, 1972

Inventor(s) Fred W. Parker

It is certified that error appears in the above-identified patent and that said Letters Patent are hereby corrected as shown below:

Claim 3, column 6, line 36, after "viscosity" please delete "of" and insert -- is --.

Claim 9, column 8, line 10, after "C" delete ID-25% and insert -- 10-25% --.

Signed and sealed this 5th day of September 1972.

(SEAL)
Attest:

EDWARD M. FLETCHER, JR.           ROBERT GOTTSCHALK
Attesting Officer                 Commissioner of Patents